US008719160B1

(12) United States Patent
Abernethy et al.

(10) Patent No.: US 8,719,160 B1
(45) Date of Patent: May 6, 2014

(54) PROCESSING PAYMENT ITEMS (75) Inventors: George Miller Abernethy, Charlotte, NC (US); Tony England, Tega Cay, SC (US); Clarence Lee, Mansfield, TX (US)

(73) Assignee: Bank of America, Charlotte, NC (US)

( * ) Notice: Subject to any disclaimer, the term of this patent is extended or adjusted under 35 U.S.C. 154(b) by 708 days.

(21) Appl. No.: 12/177,044

(22) Filed: Jul. 21, 2008

(51) Int. Cl.
*G06Q 20/04* (2012.01)
*G06Q 20/40* (2012.01)

(52) U.S. Cl.
CPC .............. *G06Q 20/04* (2013.01); *G06Q 20/042* (2013.01); *G06Q 20/40* (2013.01)
USPC ........................................................... 705/40

(58) Field of Classification Search
None
See application file for complete search history.

(56) References Cited

U.S. PATENT DOCUMENTS

| 2002/0026396 | A1* | 2/2002 | Dent et al. | 705/35 |
| 2002/0099656 | A1* | 7/2002 | Poh Wong | 705/40 |
| 2005/0021462 | A1* | 1/2005 | Teague et al. | 705/40 |
| 2006/0112011 | A1* | 5/2006 | Al-Ali | 705/42 |
| 2007/0276765 | A1* | 11/2007 | Hazel et al. | 705/71 |
| 2008/0162320 | A1* | 7/2008 | Mueller et al. | 705/35 |
| 2008/0162322 | A1* | 7/2008 | Breeden | 705/35 |
| 2008/0219422 | A1* | 9/2008 | Polozola et al. | 379/127.02 |
| 2009/0141962 | A1* | 6/2009 | Borgia et al. | 382/139 |

OTHER PUBLICATIONS

PaymentsPerspective: A quarterly Magazine by the clearying House; First quarter 2010: 3 pages at http://www.chips.org/reference/docs__newsBriefs/070441.pdf.*
FR Internal-Final 05114; 2 pages ; http://www.aba.com/NR/rdonlyres/CBDC1A5C-43E3-43CC-B733- BE417C638618/35930/DSTUFormat.pdf.*
Reserve Banks to Adopt DSTU X9.37/2003 Format for Check 21 Image Services by FR Internal—Final 051104; 2 pages Minneapolis Minn; May 18, 2004.*
Bills, Steve. "Fed OKs Imaging Standard (Which May Still Change)." American Banker. SourceMedia Inc. 2004. HighBeam Research. Jan. 4, 2013 <http://www.highbeam.com>.*
"A Guideline Document on Duplicate Image/IRD Prevention and Detection" by CheckImage' www.checkimagecentral.org/pdf/DuplicatePreventionAndDetection.pdf; 12 pages ; Dec. 2006.*

* cited by examiner

*Primary Examiner* — Ella Colbert
*Assistant Examiner* — Mary Gregg
(74) *Attorney, Agent, or Firm* — Banner & Witcoff, Ltd.; Michael A. Springs (57) ABSTRACT

Payment items are received and processed in the course of a financial transaction. For example, a paying bank may receive an electronic transmission corresponding to a imaged check from a depositing bank. The paying bank may attempt to identify a reason for return within the payment item. If a reason for return is found, a determination may be made that the payment item is a re-clear payment item that has been previously transmitted by the depositing bank and returned by the paying bank. After determining that a payment item is a re-clear, the item may be processed within the paying bank along an abbreviated processing path for faster and less costly item processing. For example, in systems in which duplicate detection is performed on payment items, re-clear items may be classified separately and need not undergo certain automated and/or manual duplicate detection processes.

24 Claims, 4 Drawing Sheets

PROCESSING PAYMENT ITEMS

FIELD OF THE TECHNOLOGY

Aspects of the disclosure generally relate to receiving and processing payment items, such as electronically imaged checks, transmitted between entities in a financial transaction.

BACKGROUND

The detection of duplicate payment items transmitted between entities is an important function of a payment system. For example, in a payment system, a payee who receives a physical check for payment of a debt from a maker may deposit the check into an account at his or her bank. This bank (the depositing bank) may digitize the physical check and transmit the check fields and related data and/or digital images of the physical check itself to the bank of the maker (the paying bank) according to a standard format for the transmission of checks. When electronic transmissions of check data, or imaged checks, are received at the paying bank, they are processed and verified before payment is made back to the depositing bank. Part of this process relates to the detection and removal of duplicate payment items. For example, if a mistake at the depositing bank, a computer network error, or the actions of a malicious party cause a single imaged check to be transmitted multiple times, it is important that the paying bank identify the duplicate payment items to prevent the maker's account from being debited multiple times.

Detecting duplicate imaged checks at the paying bank may be a costly and time-consuming process involving both automatic and manual components. For example, an automated process may be invoked to compare various data fields of the received imaged check to the corresponding data fields of previously received imaged checks that have been logged and archived in the system. However, even after this automated duplicate detection process, it might be difficult or impossible to determine whether some imaged checks are duplicates or originals. For these items, a manual review of the imaged checks may be required. For example, the paying bank may employ trained personnel to compare the scanned digital images of the physical check to the corresponding images from previously received checks.

The duplicate detection process becomes more costly when an imaged check closely resembles a previously received check, thus requiring additional duplicate detection processing and/or manual review. As an example, a check processed by a paying bank might fail to clear for one or more reasons, such as failure to verify the check data, or if the maker's account does not contain the required funds. When the check fails to clear, the paying bank may transmit a return record to the depositing bank to indicate that the check did not clear and provide a reason for return. Upon receiving the return record file, a depositing bank will often simply re-present the imaged check back to the paying bank after some period of time. This is done because checks that fail to clear on their first attempt will often successfully clear on a subsequent attempt the following day or several days later. These "re-clear" payment items transmitted by the depositing bank can cause special difficulty during the duplicate detection processes at the paying bank. Because re-clear payment items represent separate transactions between the depositing bank and the paying bank, they often need to be distinguished from true duplicate transmissions. However, re-clear items may have many of the same data field values as the original check item previously transmitted and archived. Thus, re-clear payment items may be mistaken for duplicate transmissions by the automated duplicate detection systems. Additionally, any scanned images of the physical check contained in the re-clear item may be similar (or even identical) to the images from the originally transmitted check. Therefore, even when using manual duplicate detection processing in conjunction with automated processing, transmission of re-clear payment items may result in costly duplicate detection processes and the potential for false positive determinations when identifying duplicates.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to certain aspects of the present disclosure, systems and methods are provided to receive and process payment items as part of a financial transaction or attempted transaction. For example, a system of components at a paying bank entity may receive an imaged check according to a standard format for transmission of electronic checks, such as the draft standard for trial use (DSTU) X9.37 standard or the American National Standard (ANS) X9.100-187 standard. The paying bank may attempt to process (e.g., clear) the check, for instance, by parsing and accessing an account associated with the item. In certain situations, the paying bank might not clear the check and may generate and transmit a return record to the depositing bank from which the check was received. The return record may also be formatted according to a standard format for transmission of imaged checks, and may contain a similar set of data fields and values as the received payment item, as well as certain additional data fields such as a reason for return field. After receiving the return record from the paying bank, the depositing bank may generate and transmit a second payment item corresponding to the same check. The second payment item may be similarly formatted and may preserve some or all of the data fields from the previously sent payment item and/or from the return record received from the paying bank. The pattern of payment items (forward records) sent by the depositing bank, and return records sent by the paying bank when a check does not clear, may be repeated multiple times.

According to additional aspects of the present disclosure, when receiving and processing a payment item from a depositing bank, a paying bank may attempt to identify a reason for return within the payment item. For example, if a payment item is formatted according to a standard for transmission of electronic checks (e.g., an X9 standard format), then the reason for return may be an alphanumeric value stored at a designated location within the imaged check (e.g., field 9 of record 28 of the X9 file). If the designated field is empty and/or if no reason for return can be identified within the received payment item, then the paying bank may process the payment item according to its normal protocols for processing and clearing checks. However, if a reason for return can be identified from the received payment item (e.g., if the designated field within the imaged check file is non-empty), then the paying bank may determine from the reason for return that the payment item is a re-clear item that has been previously transmitted by the depositing bank and returned by the paying bank. After determining that the payment item is a re-clear, the item may be classified and processed differently by the paying bank. For example, in systems that perform duplicate detection on payment items, re-clear items may be processed along an abbreviated processing path that does not include the certain standard automated and/or manual duplicate detection techniques.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, an apparatus, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein, referred to as computer readable transmission media, may be transferred between a source and a destination in the form of electromagnetic waves traveling through signal-conducting media such as metal wires, optical fibers, and/or wireless transmission media (e.g., air and/or space).

Figure 1:
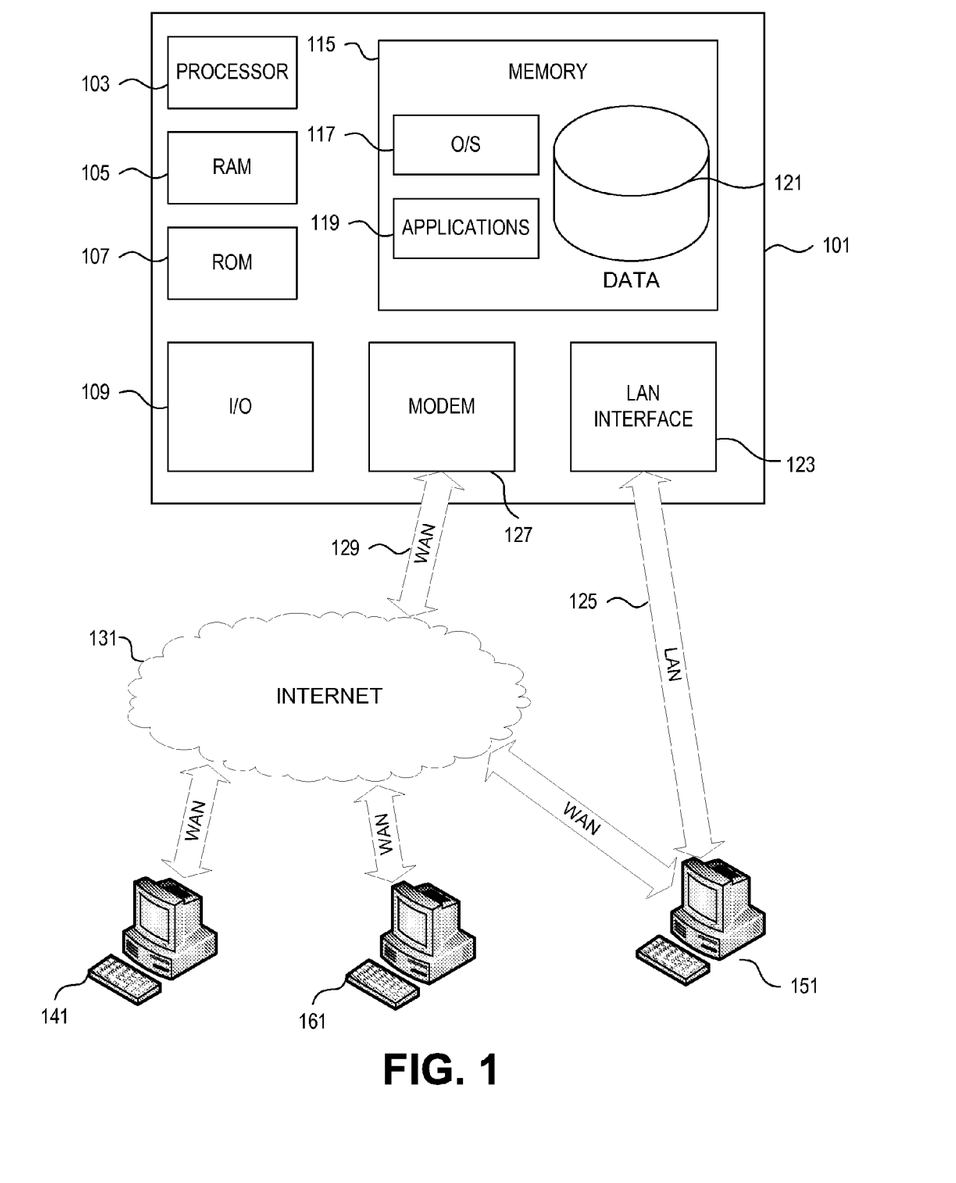
FIG. 1 is a block diagram illustrating a computing device and network, in accordance with illustrative aspects of the present invention.

FIG. 1 illustrates a block diagram of a generic computing device 101 (e.g., a client desktop or laptop computer, a mobile device, a computer server such as a web server, a data store providing services, and the like) that may be used according to an illustrative embodiment of the invention. The computer 101 may have a processor 103 for controlling overall operation of the server and its associated components, including RAM 105, ROM 107, input/output module 109, and memory 115.

I/O 109 may include a microphone, keypad, touch screen, mouse, and/or stylus through which a user of the computer 101 may provide input, and may also include one or more of a speaker for providing audio output and a video display device for providing textual, audiovisual and/or graphical output. Other I/O devices may also be used. Software may be stored within memory 115 and/or external storage to provide instructions to processor 103 for enabling computer 101 to perform various functions. For example, memory 115 may store software used by the computer 101, such as an operating system 117, application programs 119, and an associated database 121. Alternatively, some or all of the computer executable instructions in computer 101 may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Figure 2:
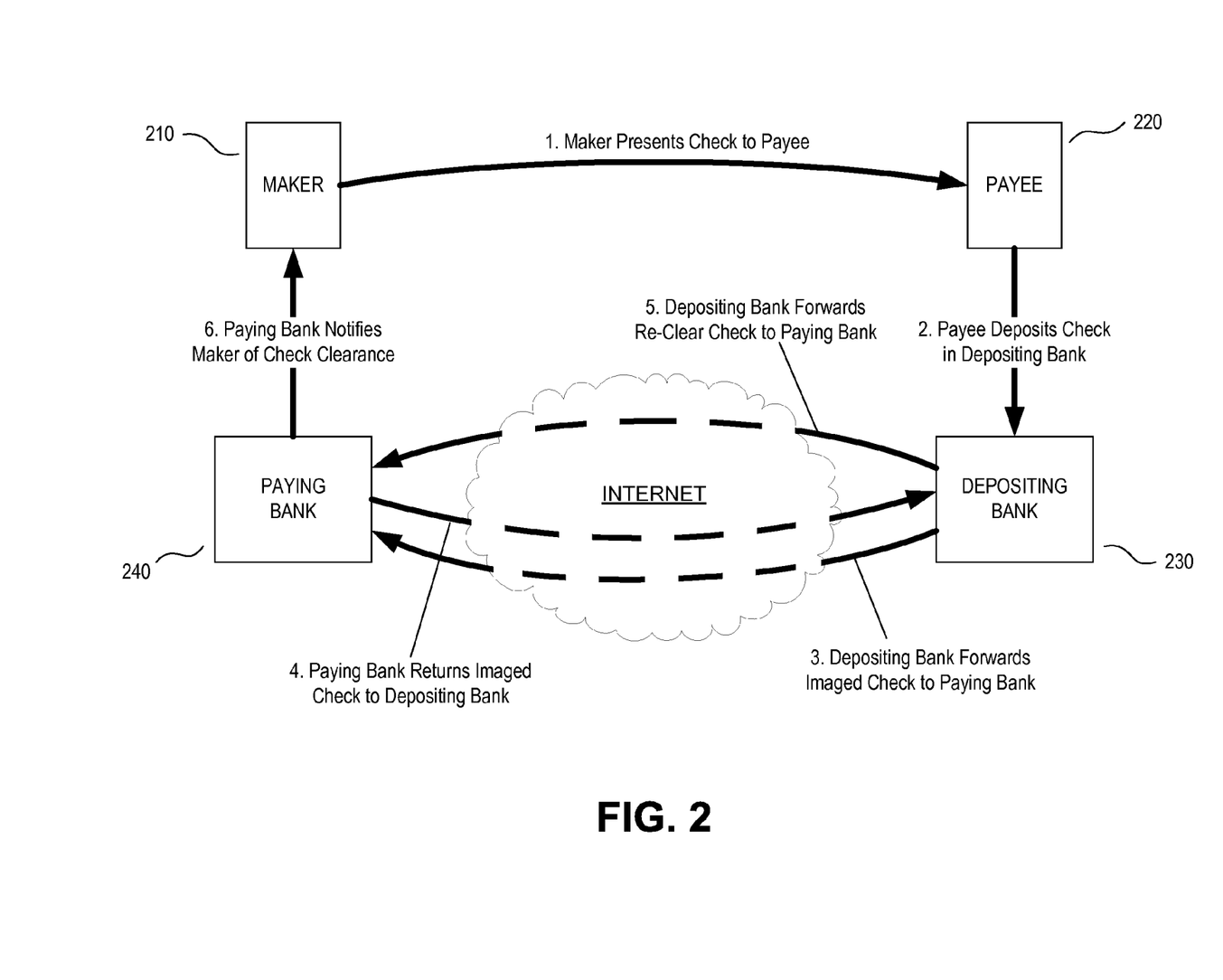
FIG. 2 is a block diagram showing the components of an illustrative system for processing a payment item between multiple entities, in accordance with illustrative aspects of the present invention.

Referring to FIG. 2, a component block diagram is shown illustrating the interactions between different parties involved in processing a payment item, such as a check. In this example, a maker 210 (e.g., a payor or other party responsible for making payment) initiates the process by signing and presenting a physical check to a payee 220. For instance, the maker 210 may be an individual customer and the payee 220 may be a store at which the customer 210 is making a purchase. In other examples, the maker 210 and/or payee 220 may represent individuals, businesses, trusts, financial instructions, or any other entity that may be a party to a financial transaction. Additionally, makers 210 and payees 220 in certain examples may either represent the end users of the transaction or intermediate entities in a larger system, as long as, from a certain perspective within the transaction, the maker 210 is an entity making payment and the payee 220 is an entity to whom payment is made.

The payment item in this example is referred to as a check, i.e., a physical check presented by the maker 210 to the payee 220. However, in other examples, a payment item need not be a physical check but may correspond to other forms of payment, such as, money orders, image replacement document (IRD) checks, wire transfers, electronic checks, and payments made via e-commerce services that allow online users to securely transfer money without needing to create a physical payment item. In this example, regardless of the type of the payment item (e.g., physical check, wire transfer, payment via Internet service), the payment item may correspond to an order (or authorization) from the maker 210 instructing the paying bank 240 to pay a specific amount of money. The maker 210 may have an account with funds at the paying bank 240. On a physical check, the instructions to the paying bank 240 are often printed directly on the physical check, including maker's 210 account number at the paying bank 240, the amount of money to be paid, and the name of the payee 220. In other examples, such as payments made via an Internet service, the payment item may correspond to an email or a secure transaction to a payment website which authorizes the website to initiate a transfer of funds from the paying bank 240 to the payee 220 or depositing bank 230. When using an Internet service to make payments, a user may initially set up an account by providing their bank account information (e.g., routing control number and account number) and/or by providing pre-authorization for the transfer of funds up to a certain amount.

Returning to the example shown in FIG. 2, after the maker 210 presents the check (e.g., by mail, in person, electronic transfer, and the like) to the payee 220 (see transmission #1), the check is deposited in the payee's bank (i.e., depositing bank 230) (see transmission #2). At this point, the depositing bank 230 may forward the check to the paying bank 240 in order to receive payment (see transmission #3). As discussed above, in older systems, a depositing bank 230 may ship the physical copy of the check to the paying bank 240 and then receive payment after the check had been received and cleared by the paying bank 240. However, as a result of the Check 21 Legislation, the depositing bank may digitize the check and transmit data corresponding to the check characteristics and/or a digital image of the check itself to the paying bank 240 to avoid the expense and delay of shipping the physical check. Two common standards for the electronic transmission of checks are defined in the following specifications for electronic exchange of check and image data: the draft standard for trial use X9.37 (DSTU X9.37) specification, and the American National Standard X9.100-187 (ANS X9.100-187) specification. Both the DSTU X9.37 and ANS X9.100-187 standards involve generating and transmitting a data object (e.g., data record) formatted to comply with the corresponding standard. Each DSTU X9.37 and/or ANS X9.100-187 data record, and the corresponding file, includes a number of data fields corresponding to the check fields and other characteristics of the check, and may also include scanned digital images of the front and back of the physical check.

Although the examples described below refer to specific fields in the DSTU X9.37 and/or ANS X9.100-187 standards, it should be understood that the inventive concepts described herein are not limited to the DSTU X9.37 and/or ANS X9.100-187 standards or to any other specific format for the transmission of checks. Other examples may apply to different image exchange standards (e.g., custom designed and/or proprietary electronic check image data formats), as well as various techniques for transmitting other types of payment items. That is, the techniques described herein relate to processing electronic payment items in a system in which duplicate payment items and re-clear payment items may potentially be received; these techniques are not limited to the specific format of the electronic payment items.

Returning to the example shown in FIG. 2, after the depositing bank 230 forwards the imaged check to the paying bank 240 (see transmission #3), the paying bank 240 may process and attempt to complete a financial transaction associated with the received check. For example, the paying bank 240 may first parse the received DSTU X9.37 or ANS X9.100-187 file and identify a bank account number associated with the check, in order to confirm that the account number corresponds to a valid account at the paying bank 240. After an initial validation, the paying bank 240 may commence the check clearing and payment process according to the internal procedures and/or other banking protocols. At this point, if the check clears, then the paying bank 240 may transfer the appropriate funds from the maker's account to the depositing bank 230 to be deposited in the payee's account.

However, in the example shown in FIG. 2, the initial imaged check received from the depositing bank 230 (see transmission #3) is not cleared by the paying bank 240. For instance, during the check clearing process, the paying bank 240 may have determined that the maker's account does not contain the funds required to cover the amount of the check. Additional examples of reasons that a check might not be cleared by a paying bank 240, along with corresponding sets of alphanumeric return reason codes for the DSTU X9.37 and ANS X9.100-187×9.37 standards are shown in Tables 1 and 2 below. In these cases, instead of transferring funds to the depositing bank 230, the paying bank 240 may return the check to the depositing bank 230 with an explanation of the reason for return (see transmission #4). According to the DSTU X9.37 and ANS X9.100-187 standard formats, the paying bank 240 may generate and transmit a DSTU X9.37 and/or ANS X9.100-187 return record file including the same set of data fields that were in the forward record for the check (e.g., the initial DSTU X9.37 and/or ANS X9.100-187 file received from depositing bank 230), along with several new fields added and populated by the paying bank 240, such as a reason for return field. The return record may also include the same digital images of the front and back of the physical check.

TABLE 1

X9.37 Return Reason Codes for Customer Transactions

| Return Code Value | Description |
| --- | --- |
| 'A' | Account Does Not Contain the Required Funds |
| 'B' | UCF - Uncollected Funds Hold |
| 'C' | Stop Payment |
| 'D' | Closed Account |
| 'E' | UTLA - Unable to Locate Account |
| 'F' | Frozen/Blocked Account |
| 'G' | Stale Dated |
| 'H' | Post Dated |
| 'J' | Endorsement Irregular |
| 'K' | Signature(s) Missing |
| 'L' | Signature(s) Irregular |
| 'M' | Non-Cash Item (Non-Negotiable) |
| 'N' | Altered/Fictitious Item |
| 'O' | Unable to Process (e.g. Mutilated Item) |
| 'P' | Item exceeds dollar limit |
| 'R' | Branch/Account Sold (Wrong Bank) |
| 'S' | Refer to Maker |
| 'T' | Stop Payment Suspect |
| 'V' | Image fails security check |
| 'W' | Cannot Determine Amount |

TABLE 2

X9.100-187 Return Reason Codes for Customer Transactions

| Return Code Value | Description |
| --- | --- |
| 'A' | Account Does Not Contain the Required Funds |
| 'B' | UCF - Uncollected Funds Hold |

TABLE 2-continued

X9.100-187 Return Reason Codes for Customer Transactions

| Return Code Value | Description |
|---|---|
| 'C' | Stop Payment |
| 'D' | Closed Account |
| 'E' | UTLA - Unable to Locate Account |
| 'F' | Frozen/Blocked Account |
| 'G' | Stale Dated |
| 'H' | Post Dated |
| 'J' | Endorsement Irregular |
| 'K' | Signature(s) Missing |
| 'L' | Signature(s) Irregular |
| 'M' | Non-Cash Item (Non-Negotiable) |
| 'N' | Altered/Fictitious Item |
| 'O' | Unable to Process (e.g. Mutilated Item) |
| 'P' | Items Exceeds Dollar Limit |
| 'R' | Branch/Account Sold (Wrong Bank) |
| 'S' | Refer to Maker |
| 'T' | Stop Payment Suspect |
| 'V' | Image fails security check |
| 'W' | Cannot Determine Amount |
| 'Y' | Duplicate Presentment |
| 'Z' | Forgery |

Upon receiving the return record file (e.g., a DSTU X9.37 or ANS X9.100-187 return file) from the paying bank 240 (see transmission #4), the depositing bank 230 and/or the payee 220 may determine how to proceed based on the knowledge that the check did not clear on its first attempt. As mentioned above, many checks which fail to clear on their first attempt will successfully clear on a subsequent attempt the following day or several days later. For example, a maker 210 who knows that he has written a check for more money than is in his account may transfer money in from another source at the same time; however, the transferred funds might not arrive until after the first clearance attempt. Periodic scheduled deposits, such as direct deposit payroll and benefits systems, that are deposited into users accounts may also result in situations when a first clearance attempt may fail but a subsequent attempt to clear the same check may succeed. Empirical studies have shown that as many as 50% of these "re-clear" check attempts may be successful on the second attempt. Accordingly, the depositing bank 230, in response to the received return record, may transmit a second forward record based on the return record back to the paying bank 240 (see transmission #5). The second forward record may be generated using many (or all) of the same data field values retrieved from the return record received from the paying bank 240. For example, according to the DSTU X9.37 and ANS X9.100-187 standard formats, the depositing bank 230 may essentially flip the return record, retaining the same data fields and digital images of the earlier transmissions, and then simply add new headers and new endorsement records to create the second forward record payment item. Upon receiving the second forward record (see transmission #5), the paying bank 240 may process and make a second attempt to clear the check. Thus, the paying bank 240 may parse the received DSTU X9.37 or ANS X9.100-187 file, retrieve the relevant data fields, and attempt to access the maker's account to withdraw the funds requested by the check. Although not shown in FIG. 2, this pattern of forward record payment items sent by the depositing bank 230, and return records sent by the paying bank 240 when a check does not clear, may be repeated multiple times for a single check.

Additionally, as noted above, the processing at the paying bank 240 of the initial forward record (see transmission #3) and the re-clear forward record (see transmission #5) may include one or more duplicate detection processes so that duplicate payment items received by the paying bank 240 may be identified and then discarded and/or analyzed. As an example, if the depositing bank 230 mistakenly transmits the initial forward record (see transmission #3) twice, this should be detected by the paying bank 240 to prevent the maker's account from being debited twice. In other scenarios, a duplicate payment item may be received at a paying bank 240 because of an error at an Internet payment service, network router, or other intermediate network component, or because of an intentional fraudulent attempt by a malicious party. The details of duplicate detection processes are well-known in the art of image exchange/electronic check transmission and are beyond the scope of this disclosure. However, as discussed above, it should be noted that many conventional duplicate detection processes may mistakenly identify certain re-clear payment items (see transmission #5) as duplicates because they share common data fields with the initial forward payment item (see transmission #3), and because the digital image(s) of the physical check included in the re-clear transmission may be similar or identical to the image(s) transmitted with the initial forward item. Thus, in the example of FIG. 2, conventional systems might mistakenly process the re-clear check (transmission #5) as a duplicate.

Figure 3:
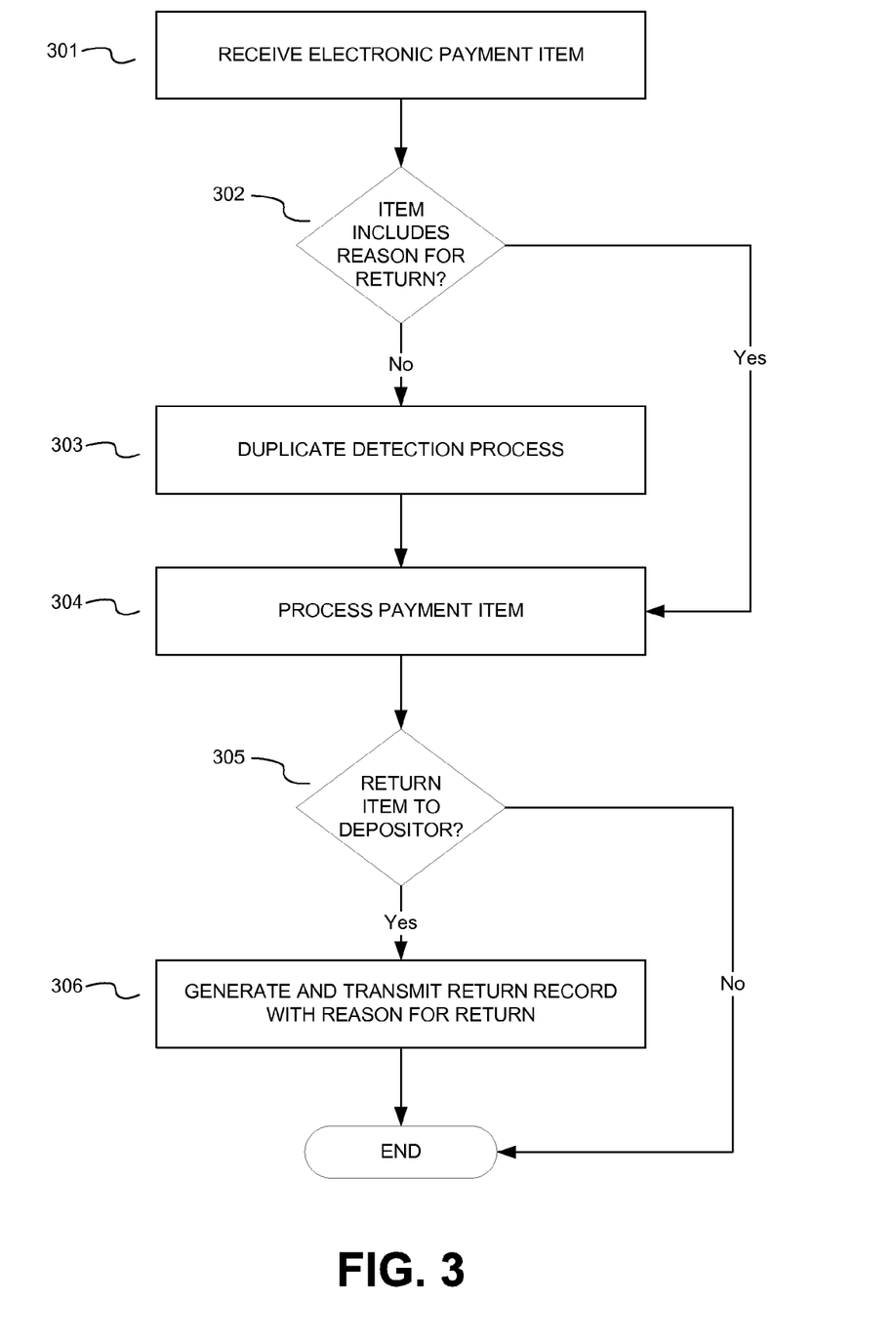
FIG. 3 is a flow diagram showing illustrative steps for processing payment items, in accordance with illustrative aspects of the present invention.

Referring to FIG. 3, a flow diagram is shown including illustrative steps for receiving and processing a payment item. In certain examples, the receiving and processing entity may be a paying bank 240 receiving a DSTU X9.37 or ANS X9.100-187 file corresponding to an imaged check from a depositing bank 230. However, as described above, the illustrative steps in FIG. 3 are not limited as such, but may apply to additional entities that receive payment items besides the paying bank 240, may apply to other types of payment items besides DSTU X9.37 or ANS X9.100-187 data files corresponding to checks. Other examples may include configurations in which the payment items are not received from a depositing bank 230, but from an alternative source such as an intermediary entity, an Internet payment service, or directly from the payee. Additionally, the paying entity may receive payment items from several different depositing banks and other entities concurrently. For instance, a paying bank 240 might receive the initial forward records from a depositing bank 230, but may receive any corresponding re-clear return records from a different entity, such as a separate return record processing system associated with the depositing bank 230.

In step 301, a receiving entity (e.g., a paying bank 240) receives an electronic payment item (e.g., a DSTU X9.37 or ANS X9.100-187 imaged check file transmitted by a depositing bank 230). During this step, the paying bank 240 or other receiving entity may perform a basic initial processing of the imaged check, such as parsing and logging the check data and/or images from the DSTU X9.37 or ANS X9.100-187 file. In step 302, the processing entity attempts to identify a reason for return within the received payment item. For example, if the received payment item is a DSTU X9.37 or ANS X9.100-187 file, then the paying bank 240 may retrieve field 9 of record 28 of the DSTU X9.37 or ANS X9.100-187 file, the field designated for storing the reason for return according to these standards. In this example, if field 9 of record 28 is empty, that may indicate that the payment item does not have an associated reason for return (302:No). Thus, a determination may be made that the received payment item is not a re-clear item, that is, a subsequent transmission of a payment item that has already been returned by the paying bank 240. However, in this example, if field 9 of record 28 contains any non-empty value, that may indicate that the payment item does have an associated reason for return (302:

Yes), and therefore this item is a re-clear item. Of course, in other examples, alternative techniques may be used to identify the existence of a reason for return within a received payment item. For scenarios in which the payment items are not DSTU X9.37 or ANS X9.100-187 files, a field corresponding to the reason for return may be stored in other locations depending on the protocols and/or formats used for the payment items. Furthermore, it should be understood that a reason for return field need not be a specific field named as such or designated to hold the reason for return. Rather, the reason for return field may be any data object or field within the payment item that indicates that the payment item was previously received and processed by the paying bank 240 (or other corresponding receiving/paying entity).

In the received payment item is an initial forward record, or first-time transmission of an imaged check to a paying bank 240, (see transmission #3 of FIG. 2), then the payment item might not include an identified reason for return (302:No). In this example, the paying bank 240 may send the payment item to a duplicate detection process in step 303. As described above, duplicate detection may include a combination of automatic and manual processes used to determine if the received payment item is a duplicate of a previously received payment item. If so, the item may be discarded (not shown) rather than processed as a valid payment item. After the duplicate detection process in step 303 (for an item determined not to be duplicate), the payment item may be processed in step 304 according to the check clearing procedures of the paying bank 240. During this step, among other things, the paying bank 240 may validate the account number and other information on the check, and then access the maker's account to confirm that the maker 210 has the required funds to cover the check.

If step 305, a determination is made whether or not the payment item should be returned, for example, in the event of a stop payment, closed account, or if the maker's account lacks the required funds and the check cannot be cleared. For additional examples of reasons that a check might not be paid by a paying bank 240, see Tables 1 and 2 above. If it is determined that the payment item should be returned (305: Yes), then in step 306 the paying bank 240 generates a return record based on the received payment item and transmits the return record back to the source (e.g., depositing bank 230). In examples using a DSTU X9.37 and/or ANS X9.100-187 standard, the return record may be generated by essentially "flipping" and re-transmitting the imaged check file back to the depositing bank 230. Specifically, the paying banking 240 may create a new DSTU X9.37 or ANS X9.100-187 return record having the same data fields and same digital check images as the DSTU X9.37 or ANS X9.100-187 imaged check file received from the depositing bank 230. Then, the paying banking 240 may populate additional data fields in the DSTU X9.37 or ANS X9.100-187 file that apply to the check return but are not populated in the initial DSTU X9.37 or ANS X9.100-187 file received by the paying bank 240. For example, field 9 of record 28 of the DSTU X9.37 or ANS X9.100-187 file is designated to hold an alphanumeric value corresponding to a reason for return of the check. Additionally, a paying bank 240 may add information into the return record corresponding to a bank number, posting date, and sequence number. As mentioned above, if it is determined that the payment item need not be returned to the depositing bank (305:No), for example, because the check cleared successfully, then step 306 will be skipped and a return record will not be generated and transmitted to the depositing bank 230.

Thus, in this example, an initial forward record of a payment item (e.g., transmission #3 of FIG. 2), may be received and processed as described above in steps 301-306. Since the initial forward record may correspond to first transmission and first clearance attempt for the payment item sent from the depositing bank 230 to the paying bank 240, it need not include a reason for return (302:No). Assuming this check does not clear on the first attempt (305:Yes), a return record will be generated and transmitted back to the depositing bank (e.g., transmission #4 of FIG. 2). After receiving the return record, the depositing bank 230 may re-transmit the imaged check to make a second attempt to obtain payment from the paying bank 240. This second transmission of the payment item, or re-clear payment item, may correspond to transmission #5 of FIG. 2. As discussed above, this re-clear item may correspond to a second forward record generated by the depositing bank 230 that preserves many of the data field values as the return record received from the paying bank 240, including the reason for return field.

Therefore, referring again to FIG. 3, when a re-clear item is received at the paying bank 240 (step 301), it will contain many of the same fields and/or same digital images as its corresponding initial (first-attempt) forward record. However, the re-clear item in this example will also have a populated reason for return field, because it was generated based on the return record sent back from the paying bank 240 in response to the initial forward record payment item. Thus, when processing a re-clear item, the item will be identified as containing a reason for return (302:Yes), and the duplicate detection process of step 303 need not be performed on the item. As discussed above, re-clear items are not considered duplicates in this example, and may be treated differently from duplicate items during the check processing stages at the paying bank 240. Therefore, when it can be determined that an item is a re-clear item having a reason for return (302:Yes), it might not be necessary to undergo the duplicate detection process for that item. Additionally, both payment items based on original checks, and payment items based on image replacement documents (IRD's), may be formatted similarly and may use a same reason for return field (e.g., field 9 of record 28 for DSTU X9.37 and ANS X9.100-187 files). Therefore, this example may be applied similarly for both IRD's and original payment items.

Specifically, in examples when the re-clear item is transmitted as a DSTU X9.37 or ANS X9.100-187 file corresponding to an imaged check, step 302 may be performed by retrieving field 9 of record 28 of the DSTU X9.37 or ANS X9.100-187 file, the reason for return field for the related return record. In certain examples, any non-empty value for this field may be sufficient to allow the paying bank 240 to conclude that the item is a re-clear and not a duplicate, while in other examples the paying bank 240 might only classify the item as a re-clear if certain specific values (e.g., a subset of alphanumeric values) are found within the reason for return field. As noted above, in other scenarios using different data formats and protocols, other data fields or combinations of data fields may be used to determine whether or not the item contains a reason for return and whether or not the item is a re-clear.

As shown in FIG. 3, once it can be determined that an item is a re-clear item based on the existence of a reason for return (302:Yes), some or all of the duplicate detection processing normally performed by the paying bank 240 might not need to performed, thus allowing the re-clear item to be processed using an abbreviated processing path. One possibility for implementing such a system is by marking the re-clear item in a miscellaneous, available, or otherwise unused data field to convey to the downstream check processing components that the item is not a duplicate. For example, the paying bank 240 may designate an unused data field within the incoming DSTU X9.37 and ANS X9.100-187 imaged check files to mark each item as a duplicate or not a duplicate (or as an unknown with respect to its duplicate status). In this example, the downstream processing components may be configured to read this designated data field and either invoke or bypass certain duplicate detection processes depending on the value stored in the designated field.

Figure 4:
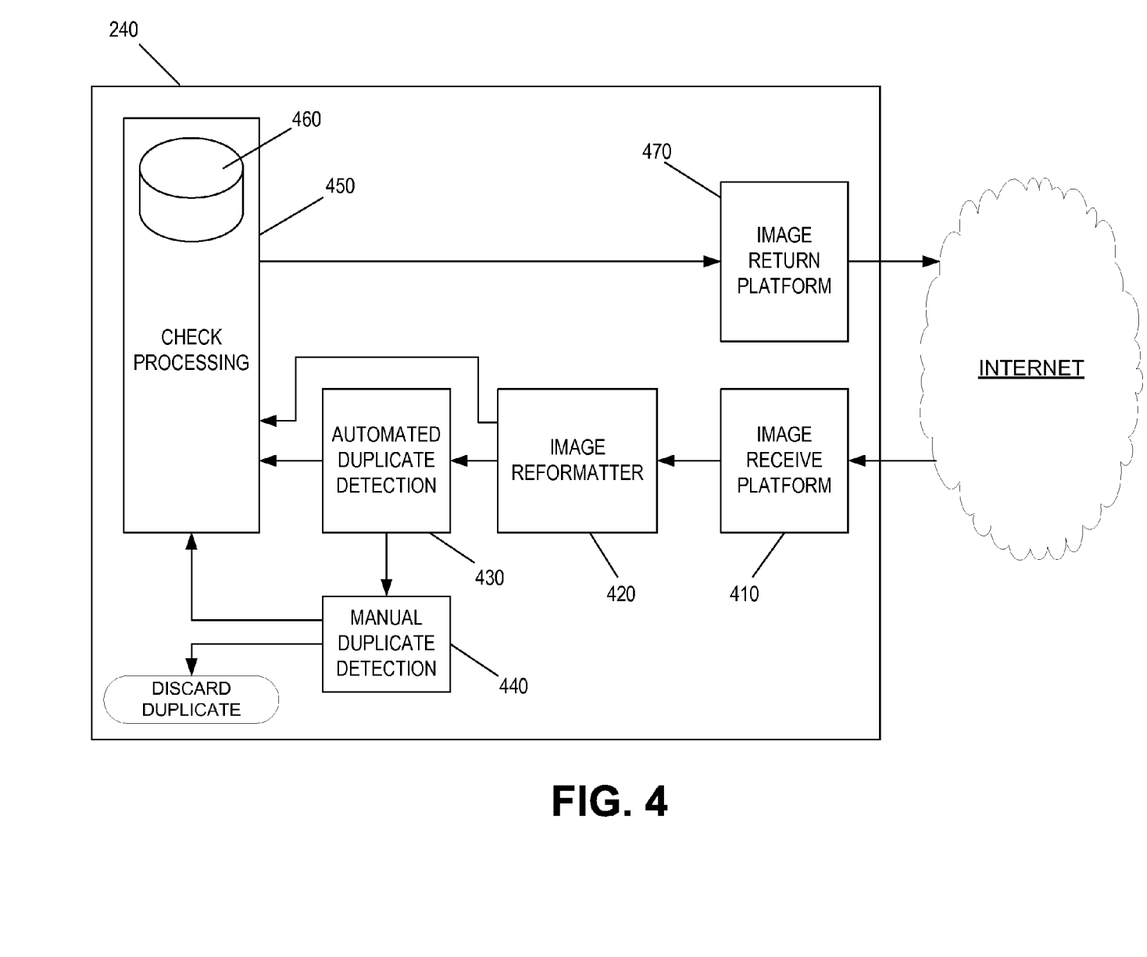
FIG. 4 is a block diagram showing the components of an illustrative system for processing a payment item, in accordance with illustrative aspects of the present invention.

An illustrative implementation of such a system is shown in FIG. 4. In this example, a paying bank 240 provides a system with a set of related hardware and/or software components. For instance, components 410-470 may be implemented as separate software processes operating and intercommunicating within one or more computer servers. In this example, imaged checks and/or other payment items are received at an image receive platform 410. From there, the images are parsed and reformatted, if necessary, by a reformatting component 420. As described above, if image receive platform 410 and/or the reformatting component 420 determine that the imaged check is not a duplicate (e.g., a re-clear item having a non-empty reason for return field), then the image reformatter 420 may forward the item directly to a check processing component 450. In other examples, an imaged check may be marked as a non-duplicate item, and then forwarded along the same component path as other non-marked items. For instance, an imaged check may be marked as a duplicate, and then forwarded to the duplicate detector components 430-440, which may be configured to read the designated data field, determine if the item is a marked as a non-duplicate, and if so, directly forward the item to the downstream components without performing any substantive or costly duplicate detection. Thus, in this example, even though no software components are completely skipped when processing a duplicate-marked payment item, the item is still processed along an abbreviated processing path because the individual components along the path may be configured to identify the item marked as a non-duplicate and streamline the processing accordingly at each component.

When the imaged check has not been marked as a non-duplicate, the automated duplicate detection component 430 may compare the data fields (e.g., DSTU X9.37 and/or ANS X9.100-187 record fields) and other image data of the imaged check to the corresponding data fields of previously received imaged checks. This archived data may be logged in history files or stored in a database within the paying bank system 240. In certain implementations, the automated duplicate detection component 430 may compare the date that the imaged check was received from the depositing bank 230 with the corresponding reception dates of the potential duplicate items. For example, in certain systems a depositing bank 430 might never transmit an initial forward record and a re-clear for the same check during the same business day. Therefore, in such systems, an automated duplication detection component 430 may be configured to conclude automatically that an item is not a re-clear if it arrived earlier in the same day. In other examples, systems may be configured to disregard as potential duplicates items received in prior business days.

Using such techniques for automated duplicate detection, and other techniques that are well-known in the art, it may be possible to definitively determine during the automated duplicate detection process 430 whether or not a payment item is a duplicate. However, if not, a manual process 440 may be invoked during which the digital images of the physical check of the duplicate suspect payment items may be compared by trained personnel to make a more conclusive determination of whether or not the payment item is a true duplicate based on the physical check images and the other available data. In this example, if an imaged check payment item is determined to be a duplicate, either by the automated or manual duplicate detection components 430-440, it will be discarded. In other examples, a payment item identified as a true duplicate may be forwarded for additional processing (e.g., to a research and adjustments department of the paying bank 240 for analysis). Additionally, the paying bank 240 may notify the depositing bank 230 of the duplicate item. Otherwise, the imaged check will be forwarded to the check processing component 450, which may retrieve maker account data and other relevant data from one or more paying bank databases 460 to determine whether the check should be paid and cleared, or returned to the depositing bank 230. When the check processing component determines that an imaged check should be returned, it may forward the item to the image return platform 470 to generate and transmit a return record to the depositing bank 230, as described above.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method of receiving and processing payment items, comprising:
   receiving a first electronic payment item at a paying bank device comprising at least one processor and memory, the paying bank device associated with a payment item processing entity;
   processing, at the paying bank device, the first electronic payment item along a first processing path performing duplicate detection processing;
   generating and transmitting, at the paying bank device, a return record based on nonpayment of the first electronic payment item, wherein the return record comprises a reason for return field;
   receiving, at the paying bank device, a second electronic payment item;
   identifying, at the paying bank device, a reason for return field encoded within the second electronic payment item;
   determining, at the paying bank device, that the second electronic payment item is a re-clear item based on the identification of the reason for return field encoded within the second electronic payment item; and
   processing, at the paying bank device, the second electronic payment item along an abbreviated processing path that does not include at least some of the duplicate detection processing of the first processing path, based on the determination that the second electronic payment item is a re-clear item.

2. The method of claim 1, wherein the processing comprises marking a predetermined field of the second electronic payment item to indicate that the second electronic payment item is not a duplicate transmission of the first electronic payment item, and then forwarding the second electronic payment item to another component for additional processing.

3. The method of claim 2, wherein based on said marking, the second electronic payment item is not sent to a duplicate detection process that is used to process other payment items.

4. The method of claim 1, wherein the first and second electronic payment items each comprise a same digital image of a check of an account holder at the payment item processing entity.

5. The method of claim 4, further comprising identifying a condition of a financial transaction associated with the first electronic payment item, said condition corresponding to a determination that an account of the account holder at the payment item processing entity does not contain an amount of funds required to clear the check.

6. The method of claim 1, wherein the second electronic payment item corresponds to an image replacement document (IRD) based on an original check.

7. The method of claim 1, wherein the first and second payment items comprise data objects formatted in accordance with one or more of the draft standard for trial use (DSTU) X9.37 standard or the American National Standard (ANS) X9.100-187 standard for electronic exchange of check and image data.

8. The method of claim 1, further comprising identifying transmission dates of the first and second electronic payment items, wherein the processing of the second electronic payment item along the abbreviated processing path is further based on a determination that the first electronic payment item and the second electronic payment item were transmitted on different days.

9. A paying bank device comprising:
   a processor controlling at least some operations of the paying bank device; and
   a memory storing computer executable instructions that, when executed by the processor, cause the paying bank device to:
      receive a first electronic payment item at the paying bank device, the paying bank device associated with a payment item processing entity;
      process, at the paying bank device, the first electronic payment item along a first processing path performing duplicate detection processing;
      generate and transmit, at the paying bank device, a return record based on the first electronic payment item, wherein the return record comprises a reason for return field;
      receive, at the paying bank device, a second electronic payment item;
      identify, at the paying bank device, a reason for return field encoded within the second electronic payment item;
      determine, at the paying bank device, that the second electronic payment item is a re-clear item based on the identification of the reason for return field encoded within the second electronic payment item; and
      process, at the paying bank device, the second electronic payment item along an abbreviated processing path that does not include at least some of the duplicate detection processing of the first processing path, based on the determination that the second electronic payment item is a re-clear item.

10. The paying bank device of claim 9, the memory storing further computer executable instructions that, when executed by the processor, cause the paying bank device to mark a predetermined field of the second electronic payment item to indicate that the second electronic payment item is not a duplicate transmission of the first electronic payment item, and then forward the second electronic payment item to another component for additional processing.

11. The paying bank device of claim 10, wherein based on said marking, the second electronic payment item is not sent to a duplicate detection process that is used to process other payment items.

12. The paying bank device of claim 9, wherein the first and second electronic payment items each comprise a same digital image of a check of an account holder at the payment item processing entity.

13. The paying bank device of claim 12, the memory storing further computer executable instructions that, when executed by the processor, cause the paying bank device to identify a condition of a financial transaction associated with the first electronic payment item, said condition corresponding to a determination that an account of the account holder at the payment item processing entity does not contain an amount of funds required to clear the check.

14. The paying bank device of claim 9, wherein the second electronic payment item corresponds to an image replacement document (IRD) based on an original check.

15. The paying bank device of claim 9, wherein the first and second payment items comprise data objects formatted in accordance with one or more of the draft standard for trial use (DSTU) X9.37 standard or the American National Standard (ANS) X9.100-187 standard for electronic exchange of check and image data.

16. The paying bank device of claim 9, the memory storing further computer executable instructions that, when executed by the processor, cause the paying bank device to identify transmission dates of the first and second electronic payment items, wherein the processing of the second electronic payment item along the abbreviated processing path is further based on a determination that the first electronic payment item and the second electronic payment item were transmitted on different days.

17. One or more computer readable media storing computer-executable instructions which, when executed on a paying bank system, cause the paying bank system to perform:
   receiving a first electronic payment item at the paying bank system, the paying bank system associated with at a payment item processing entity;
   processing, at the paying bank system, the first electronic payment item along a first processing path performing duplicate detection processing;
   generating and transmitting at the paying bank system, a return record based on the first electronic payment item, wherein the return record comprises a reason for return field;
   receiving, at the paying bank system, a second electronic payment item;
   identifying, at the paying bank system, a reason for return field encoded within the second electronic payment item;
   determining, at the paying bank system, that the second electronic payment item is a re-clear item based on the identification of the reason for return field encoded within the second electronic payment item; and
   processing, at the paying bank system, the second electronic payment item along an abbreviated processing path that does not include at least some of the duplicate detection processing of the first processing path, based on the determination that the second electronic payment item is a re-clear item.

18. The computer readable media of claim 17, storing further computer-executable instructions which, when executed on the paying bank system, cause the paying bank system to perform:

marking a predetermined field of the second electronic payment item to indicate that the second electronic payment item is not a duplicate transmission of the first electronic payment item, and then forwarding the second electronic payment item to another component for additional processing.

19. The computer readable media of claim 18, wherein based on said marking, the second electronic payment item is not sent to a duplicate detection process that is used to process other payment items.

20. The computer readable media of claim 17, wherein the first and second electronic payment items each comprise a same digital image of a check of an account holder at the payment item processing entity.

21. The computer readable media of claim 20, storing further computer-executable instructions which, when executed on the paying bank system, cause the paying bank system to perform:

identifying a condition of a financial transaction associated with the first electronic payment item, said condition corresponding to a determination that an account of the account holder at the payment item processing entity does not contain an amount of funds required to clear the check.

22. The computer readable media of claim 17, wherein the second electronic payment item corresponds to an image replacement document (IRD) based on an original check.

23. The computer readable media of claim 17, wherein the first and second payment items comprise data objects formatted in accordance with one or more of the draft standard for trial use (DSTU) X9.37 standard or the American National Standard (ANS) X9.100-187 standard for electronic exchange of check and image data.

24. The computer readable media of claim 17, storing further computer-executable instructions which, when executed on the paying bank system, cause the paying bank system to perform:

identifying transmission dates of the first and second electronic payment items, wherein the processing of the second electronic payment item along the abbreviated processing path is further based on a determination that the first electronic payment item and the second electronic payment item were transmitted on different days.

* * * * *